US012762243B2

(12) United States Patent
Kumar

(10) Patent No.: US 12,762,243 B2
(45) Date of Patent: Oct. 13, 2026

(54) SYSTEMS AND METHODS FOR CRYPTOGRAPHICALLY VERIFYING A USER OF A COMPUTING DEVICE AT THE BOOTLOADER LEVEL

(71) Applicant: Selective Intellect LLC, Livingston, NJ (US)

(72) Inventor: Vikas Naresh Kumar, Livingston, NJ (US)

(73) Assignee: Selective Intellect LLC, Livingston, NJ (US)

( * ) Notice: Subject to any disclaimer, the term of this patent is extended or adjusted under 35 U.S.C. 154(b) by 233 days.

(21) Appl. No.: 18/775,082

(22) Filed: Jul. 17, 2024

(65) Prior Publication Data

US 2025/0045408 A1 Feb. 6, 2025

Related U.S. Application Data

(60) Provisional application No. 63/517,475, filed on Aug. 3, 2023.

(51) Int. Cl.
*G06F 21/57* (2013.01)
*H04L 9/32* (2006.01)

(52) U.S. Cl.
CPC .......... *G06F 21/575* (2013.01); *G06F 21/572* (2013.01); *H04L 9/3234* (2013.01)

(58) Field of Classification Search
None
See application file for complete search history.

(56) References Cited

U.S. PATENT DOCUMENTS

| | | | | |
|---|---|---|---|---|
| 2019/0228143 | A1* | 7/2019 | Guyomarc'h | G06Q 20/3276 |
| 2019/0370006 | A1* | 12/2019 | Silva | G06F 21/575 |
| 2019/0377583 | A1* | 12/2019 | Kumar | G06F 21/44 |
| 2020/0184078 | A1* | 6/2020 | Hinrichs | H04L 9/3268 |
| 2021/0373909 | A1* | 12/2021 | Zimmermann | H04L 9/3271 |
| 2022/0171614 | A1* | 6/2022 | Wolnowski | G06F 8/654 |
| 2022/0350615 | A1* | 11/2022 | Grobelny | H04L 9/3226 |
| 2023/0325203 | A1* | 10/2023 | Warkentin | G06F 9/4406 713/2 |
| 2024/0143723 | A1* | 5/2024 | Viswanathan | H04L 9/3228 |

* cited by examiner

*Primary Examiner* — Danny Chan
(74) *Attorney, Agent, or Firm* — Ansari Katiraei LLP; Arman Katiraei

(57) ABSTRACT

Disclosed is a system and associated methods for cryptographically verifying a user of a computing device at the bootloader level and before the loading of an operating system (OS). The cryptographic verification involves loading a boot authentication controller into a memory of the computing device upon powering on the computing device. The boot authentication controller restricts access to the computing device by preventing an OS from being loaded into the memory during the boot process. The boot authentication controller determines a level-of-access that a particular user has on the computing device from a received encoded value, customizes the OS with the level-of-access specified in the encoded value, and boots the computing system with a customized OS that provides the level-of-access.

20 Claims, 8 Drawing Sheets

300

| UserID | Computing Device ID | Level-of-access |
|---|---|---|
| U1 | C1,C3,C7 | LOA1 |
| U1 | C2,C4 | LOA2 |
| U1 | C5 | LOA3 |
| U2 | C3, C4, C5, C6 | LOA3 |
| U3 | C1,C8 | LOA1 |
| U3 | C2,C4,C6 | LOA4 |

FIG. 3

| UserID | Computing Device ID | Level-of-access |
|---|---|---|
| U1 | C1,C3,C7 | OS1v1 |
| **U1** | **C2**,C4 | OS2v2 |
| U1 | C5 | OS1v2 |
| U2 | C3, C4, C5, C6 | OS2v1 |
| U3 | C1,C8 | OS1v2 |
| **U3** | **C2**,C4,C6 | OS2v1 |

SYSTEMS AND METHODS FOR CRYPTOGRAPHICALLY VERIFYING A USER OF A COMPUTING DEVICE AT THE BOOTLOADER LEVEL

CLAIM OF BENEFIT TO RELATED APPLICATIONS

This application claims the benefit of U.S. provisional application 63/517,475 with the title "SYSTEM TO CRYPTOGRAPHICALLY VERIFY AN UNTRUSTED USER OF A COMPUTER SYSTEM USING QR CODES AT THE BOOTLOADER LEVEL", filed Aug. 3, 2023. The contents of application 63/517,475 are hereby incorporated by reference.

BACKGROUND

A user of a computing device running a traditional operating system (OS), such as Windows®, Linux®, MacOS®, FreeBSD, OpenBSD®, or various other UNIX® variants, obtains access to the computing device by using, at a minimum, a login username and password. The computing device may also perform multi-factor authentication, require a time-based code, or require a pre-selected passphrase as an additional step to secure access to the computing device.

However, scenarios exist where these security mechanisms (e.g., username and password authentication or multi-factor authentication) are insufficient. Such scenarios exist in secure facilities such as military installations, Sensitive Compartmented Information Facilities (SCIFs), hospitals where patient data needs to be secured, critical infrastructure systems, and so on. The security mechanisms that are in place at the OS level may be circumvented or rendered ineffective by a ransomware attack, malicious entities repurposing the computing devices to perform unauthorized tasks, rogue employees with permissive authorization performing data theft, or unauthorized remote access to the computing devices.

Accordingly, there is a need to improve the computing device security. Specifically, there is need to ensure that the user accessing the computing system is physically present before the computing device, is not using login credentials of another user, and cannot exploit OS vulnerabilities.

BRIEF DESCRIPTION OF THE DRAWINGS

FIG. 3 illustrates example records for different levels-of-access that different users have on different computing devices in accordance with some embodiments presented herein.

DETAILED DESCRIPTION OF PREFERRED EMBODIMENTS

The following detailed description refers to the accompanying drawings. The same reference numbers in different drawings may identify the same or similar elements.

Provided are systems and associated methods for cryptographically verifying a user of a computing device at the bootloader level. The systems and methods implement a secure boot authentication procedure at the bootloader stage of the computing device. The secure boot authentication procedure involves performing a cryptographical verification of a user during the computing system initialization that immediately occurs after the computing device is powered on and prior to the operating system (OS) being loaded and executed on the computing device. The secure boot authentication procedure may be stored and executed as part of the computing device firmware, firmware of peripheral devices that are connected to the computing device, or an Extensible Firmware Interface (EFI) file that control the boot process of the computing device. The secure boot authentication procedure requires the user to be physically present before the computing device, verifies that the login credentials being provided are those of the user that is physically present before the computing device, and eliminates any attack vectors that exploit OS vulnerabilities or software running atop the OS.

The systems and methods may be adapted and implemented on any computing device that uses a bootloader to initialize the computing device. The systems and methods are agnostic of the OS that is subsequently loaded onto the computing device. In fact, the secure boot authentication procedure may be used to load the computing device with different OSes, customized OS images, different OS functionality, and/or different OS access depending on rights associated with the user that is authenticated through the secure boot authentication procedure.

Figure 1:
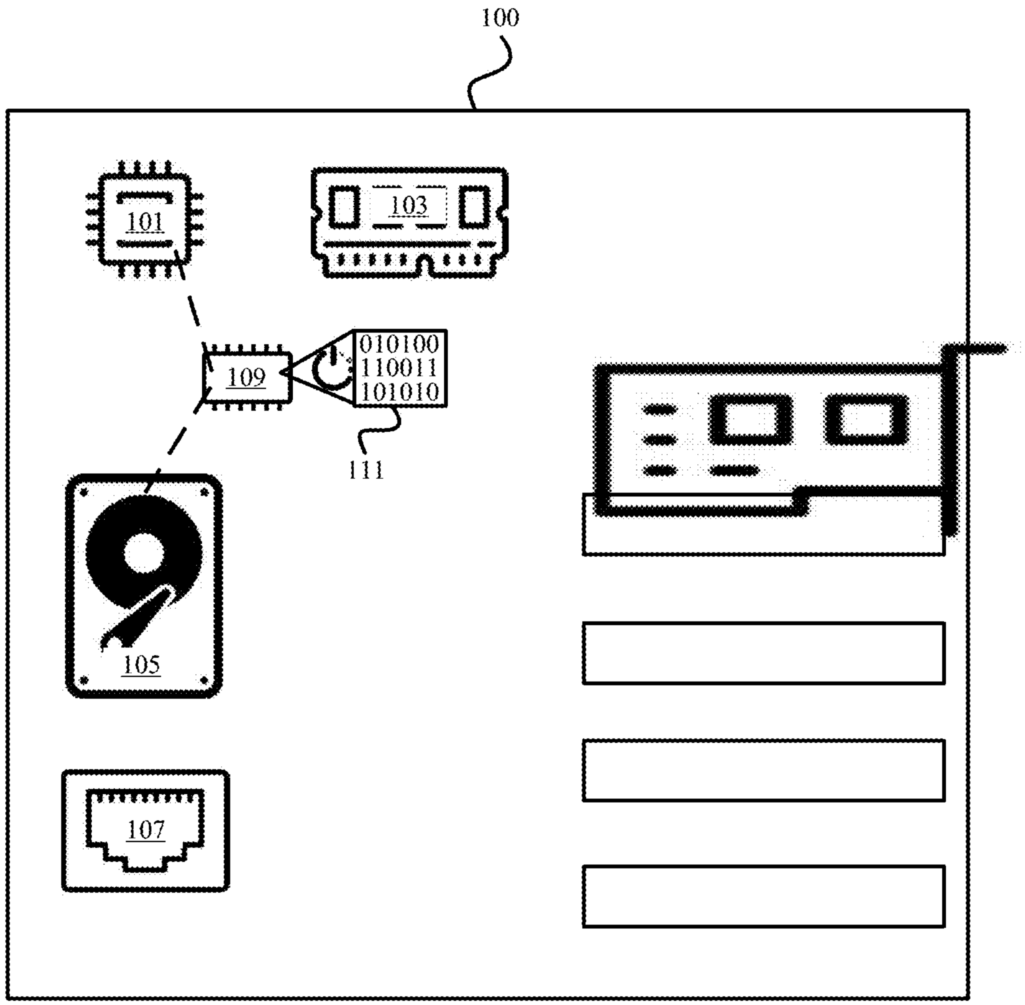
FIG. 1 illustrates an example computing device architecture for implementing the secure boot authentication procedure in accordance with some embodiments presented herein.

FIG. 1 illustrates an example computing device architecture 100 for implementing the secure boot authentication procedure in accordance with some embodiments presented herein. Computing device architecture 100 may be representative of various computing devices including desktop computing devices, laptop devices, tablet devices, smart phones, wearable devices, and/or other machines or devices in a secure facility, that have access to critical or confidential data, and/or that otherwise require a heightened level of security.

Computing device architecture 100 includes one or more hardware processors 101 for executing machine-executable code or instructions, volatile memory 103 (e.g., Random Access Memory (RAM)), non-volatile storage 105, network module 107, and firmware 109.

Firmware 109 may be stored in a Read Only Memory (ROM) or a non-volatile memory chip that may be updated or programmed. In some embodiments, firmware 109 corresponds to the Basic Input Output System (BIOS) of legacy computing device or the Unified Extensible Firmware Interface (UEFI) of newer computing devices. In some other embodiments, firmware 109 corresponds to an option ROM of a peripheral device.

Firmware 109 stores machine-executable code that specifies the boot sequence for initializing and/or starting the computing device. The boot sequence may include performing checks of the one or more hardware processors 101, performing a discovery operation to detect hardware components, resources, and/or connected peripherals (e.g., network module 107, video cards, a keyboard, other input devices, etc.) of the computing system, and controlling the order with which different software components, drivers, and/or other programs (e.g., OS bootloader such as the Windows® bootloader or Grand Unified Bootloader (GRUB)) are loaded into memory 103 and executed by one or more hardware processors 101. Drivers or software for initializing the detected hardware components, resources, and/or connected peripherals may be retrieved from option ROMs of the detected hardware components, resources, and/or connected peripherals or from the UEFI, BIOS, or other parts of firmware 109.

Firmware 109 also includes boot authentication controller 111. Boot authentication controller 111 is a compiled executable binary file that includes the machine-executable code for executing the computing device-side operations of the secure boot authentication procedure. Boot authentication controller 111 may be implemented as a virtual peripheral device driver, as a UEFI application, a BIOS option ROM, or other firmware 109 executable module that is loaded and initialized by one or more hardware processors 101 during the computing device boot sequence. Boot authentication controller 111 has priority over the OS bootloader, is defined to execute before the OS bootloader in the computing device boot sequence, is specified before the OS bootloader in the chain-loading sequence of UEFI applications, or executes the OS bootloader after completing the computing device-side operations of the secure boot authentication procedure.

In some embodiments, boot authentication controller 111 is stored in non-volatile storage 105 or directly in firmware 109 (e.g., in ROM). For instance, a file or code for boot authentication controller 111 may be stored in the boot folder on non-volatile storage 105.

The prioritized execution of boot authentication controller 111 before the OS bootloader may be specified based on the naming of the files in the boot folder. For instance, Windows®, Linux®, MacOS®, and other computing devices boot by referencing a "boot.efi", "bootx64.efi", or other EFI file that is in the boot folder of non-volatile storage 105. In some embodiments, boot authentication controller 111 may replace the EFI file and/or may execute the original EFI file after the secure boot authentication procedure is completed. In some other embodiments, the EFI file may be modified to call or execute boot authentication controller 111 before calling or executing the OS bootloader.

In some embodiments, boot authentication controller 111 may be directly added to firmware 109 by tools that allow for the updating of firmware 109. For instance, open source bootloaders such as Coreboot or LinuxBoot may be used to perform security updates to firmware 109 and also to add boot authentication controller 111 directly into firmware 109.

Figure 2:
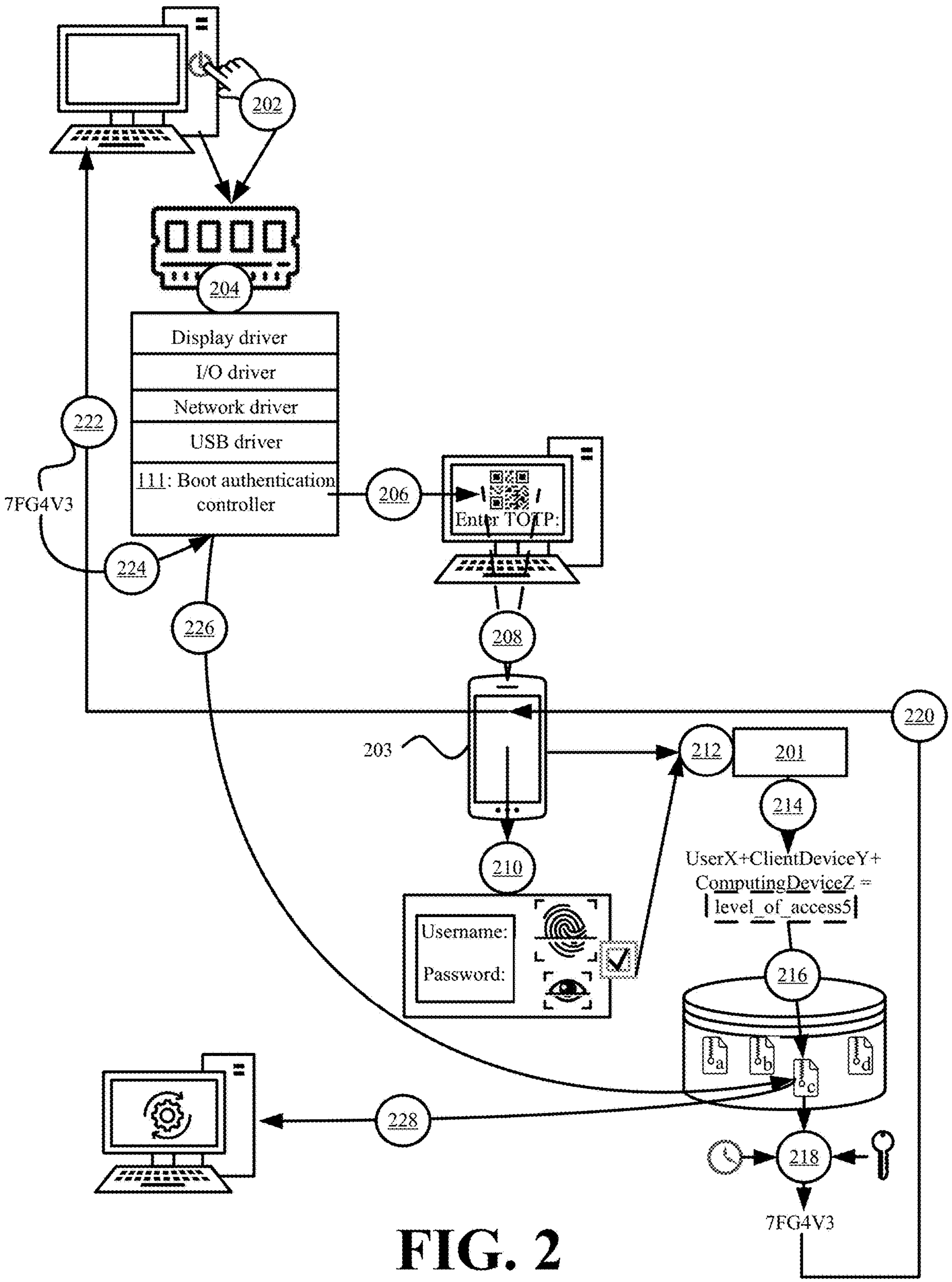
FIG. 2 illustrates an example of the secure boot authentication procedure performed at the bootloader level in accordance with some embodiments presented herein.

FIG. 2 illustrates an example of the secure boot authentication procedure performed at the bootloader level in accordance with some embodiments presented herein. A user powers (at 202) on a computing device by being physically present before the computing device and pressing a power button of the computing device.

In response to the computing device powering on, the processor performs a series of tests to ensure proper operation of the processor (e.g., perform a built-in self-diagnosis (BISD)), loads or mounts the memory, probes the communication interface for attached peripheral devices (e.g., probe the Peripheral Component Interconnect (PCI) bus), and loads (at 204) option ROMs, firmware, and/or device drivers of the attached peripheral devices into memory. As part of this initialization sequence, the disk drive or non-volatile storage device of the computing device is detected and the EFI file that is replaced with the code of boot authentication controller 111 is loaded into memory and executed by the processor prior to the execution of the OS bootloader.

Consequently, before any components or code of the OS is loaded into memory, boot authentication controller 111 executes to present (at 206) an encoded value on the display of the computing device. The encoded value may be a Quick Response (QR) code or other encoded fiducial (e.g., barcode). In some embodiments, the encoded value may be encoded using a public cryptographic key that is associated with a private cryptographic key used by authentication server 201 for remote user authentication. In some other embodiments, the encoded value may be encoded using a shared secret that is configured on boot authentication controller 111 and authentication server 201.

The encoded value identifies the computing device that the user accesses. In some embodiments, the encoded value encodes unique identifying information about the computing device. The unique identifying information may include the computing device name, network address assigned to the computing device once network device drivers have been loaded and initialized, and/or other unique hardware identifiers (e.g., the network card address such as the Media Access Control (MAC) address, a hard drive identifier, a motherboard serial number, etc.). Boot authentication controller 111 may obtain the computing device identifying information by probing the computing device components or based on the device drivers that are loaded into memory during the boot process. The encoded value may also encode a time-based code and a Uniform Resource Locator (URL) that directs to authentication server 201. The time-based code may be generated based on the current time and a shared secret that is also configured on authentication server 201. In some embodiments, the encoded value encodes a blockchain cryptocurrency wallet address, a WiFi network's credentials, or a short public key for verification in an end-to-end encrypted messaging smartphone application.

Client device 203 scans (at 208) the encoded value using a camera or other scanner. Client device 203 includes a smart phone, tablet device, or other device with network connectivity and a scanner and that is registered at authentication server 201 to the user accessing the computing system.

The scanning of the encoded value initiates (at 210) a first authentication by client device 203. The first authentication may require the user to provide login credentials in order to verify access to client device 203. In some embodiments, the first authentication may be completed using a biometric verification. For instance, client device 203 may perform a retinal scan or a fingerprint scan in order to verify that the user is authorized to access client device 203 or a boot authentication application that runs on client device 203. Completing the first authentication proves that the user accessing the computing system is a specific user that is registered at authentication server 201 or in the boot authentication application as the owner of client device 203. In other words, stolen credentials of a particular user cannot be used to complete the first authentication without entering the stolen credentials on client device 203 of the particular user.

In response to successfully completing the first authentication and verifying the identity of the user on client device 203, client device 203 sends (at 212) a request to perform a second authentication with authentication server 201. The request is directed to the URL that is extracted from the encoded value. The request contains the computing device identifying information, the time-based code from the encoded value, and an authentication token that uniquely identifies client device 203 issuing the request and/or the user identified from the first authentication. In some embodiments, boot authentication controller 111 on each computing device may be configured with a unique public key that may be used instead of or in addition to the computing device identifying information in order to uniquely identify the computing device to authentication server 201.

Authentication server 201 receives the second authentication request from client device 203 over a wireless or wired data network. Authentication server 201 extracts or decodes the data within the request, and determines if the time-based code submitted with the request is valid. For instance, authentication server 201 may generate a time-based code using the same algorithm and shared secret that is configured on boot authentication controller 111, and may compare the generated time-based code with the received time-based code to verify that the request is issued by client device 203 that is physically present before the computing device and not issued with a time-based code that was recorded or captured at an earlier time when the user or another user was physical present in front of the computing device.

Authentication server 201 also verifies the user identity. Specifically, authentication server 201 determines if the identified user is using a client device 203 that is registered to that user and whether the identified user is authorized to access the computing device identified in the request. In some embodiments, client device 203 may encode unique user and/or device identifiers or tokens in the request after the verifying the user identity through the first authentication. Authentication server 201 may compare the provided identifiers or tokens with stored identifiers or tokens to verify the user and/or device identity.

Authentication server 201 may also store different levels-of-access that the user has on different computing devices. For instance, a secure facility may have different computing devices in different secure rooms. Each computing device may be connected to different local area networks (LANs) and may have access to different confidential data or systems. A user with a particular role may have full access to a first computing device with connectivity to a first set of confidential data or first systems and have restricted or no access to a second computing device with connectivity to a second set of confidential data or second systems. Authentication server 201 may restrict access by customizing the OS that is loaded on the computing device being accessed by the user.

Authentication server 201 verifies (at 214) that the identified user is authorized to access the identified computing device with a particular level-of-access. Authentication server 201 selects (at 216) a customized OS image that provides the particular level-of-access from different customized OS images that provide different levels-of-access, generates (at 218) an alphanumeric code with which the user may access the identified computing device with the selected customized OS image, and provides (at 220) the alphanumeric code to client device 203.

The alphanumeric code is time-based. In some embodiments, the alphanumeric code is a time-based one-time password (TOTP). In other words, authentication server 201 generates the alphanumeric code using a shared secret and a time value so that the alphanumeric code is valid for a short period of time and cannot be used to access the computing device after the period of time expires.

In some embodiments, authentication server 201 uses its private cryptographic key to encode a URL or filesystem path at which the computing system may download, retrieve, and/or otherwise access the selected custom OS image. In some embodiments, authentication server 201 uses its shared or private cryptographic key to encode a decryption key and/or OS identifier for the selected customized OS image. In some such embodiments, encrypted copies of different OS images may be stored on the non-volatile storage of the computing device, the OS identifier may be used to identify the encrypted copy of the selected custom OS image (e.g., file name or directory path), and the decryption key may be used to decrypt the encrypted copy of the selected custom OS image on the computing device.

Client device 203 presents the alphanumeric code received from authentication server 201 on a display. A user reads the alphanumeric code and enters (at 222) the alphanumeric code on an interface of the computing device via an input device of the computing device (e.g., a keyboard).

Boot authentication controller 111 receives (at 224) the alphanumeric code. Boot authentication controller 111 decrypts or decodes (at 226) the alphanumeric code using the shared or public cryptographic key for the shared or private cryptographic key used by authentication server 201. The decrypted or decoded value may contain a time-based code and a URL, identifier, or path for the selected custom OS image and/or a key for decrypting an encrypted copy of the selected custom OS image. Boot authentication controller 111 verifies that the time-based code is valid and loads or boots (at 228) the selected custom OS image with the particular level-of-access identified in the data that is decoded from the alphanumeric code. The selected custom OS image runs on the computing device and provides the user with the particular level-of-access that the user is authorized to access.

In some embodiments, boot authentication controller 111 verifies the alphanumeric code with authentication server 201 rather than perform the decryption or decoding (at 226). In some such embodiments, boot authentication controller 111 runs a private network stack that allows boot authentication controller 111 to send the alphanumeric code with the computing device identifying information to authentication server 201, and authentication server 201 configures the computing device with the particular level-of-access and/or the selected custom OS image.

The selected custom OS image and/or the particular level-of-access configured on the computing system may modify the functionality and accessibility of the computing device. For instance, different custom OS images may install the same OS with different libraries, access permissions, hardware drivers for enabling or disabling certain components, and/or mounted filesystems. The access permissions may limit which network paths, folders, files, and/or other systems the computing device may read from, write to, or access. Assuming that the user is not authorized to access the computing device or is authorized to access the computing device with a minimal or lowest level-of-access, then boot authentication controller 111 may either boot the computing device into a heavily restricted OS that has limited internet access or it may not boot at all. Essentially, boot authentication controller 111 will decide which operating system the user will be shown, whether it is one that has critical data available, or whether it is a generic benign version with no critical data access.

FIG. 3 illustrates example records 300 stored by authentication server 201 for different levels-of-access that different users have on different computing devices in accordance with some embodiments presented herein. Example records 300 may be stored in a database of authentication server 201 or may be stored on a blockchain.

Each record may be defined with a user identifier, a computing device identifier, and a level-of-access. The user identifier uniquely identifies each user. In some embodiments, the user identifier may include the user name that is retrieved upon a user successfully logging into a user account or otherwise verifying their identity. In some embodiments, the user identifier combines a first value associated with the user to a second value associated with a client device that is registered to that user. In some embodiments, the user identifier may correspond to a unique alphanumeric value that links a user identity to a registered client device. For instance, each user identifier listed in example records 300 is created in response to the user registering with authentication server 201 prior to accessing any computing device. The registration involves the user providing their identifying information (e.g., creating an account with login information) and linking one or more client devices that only they have access to and that they will use to verify their identity during the secure boot authentication procedure. Accordingly, the user identifier may be associated with a unique client device identifier such as a unique device fingerprint, telephone number, Integrated Circuit Card Identification (ICCID) number, etc. The linking of the client device identifier provides additional safeguards for the secure boot authentication procedure. Specifically, a user identity is successfully verified if the user login credentials are provided from or verified by the one or more devices that are registered to that user. If the user login credentials are provided from another device or an unregistered device, authentication server 201 may assume that the user login credentials were stolen or are being used by another user attempting to gain unauthorized access. The computing device identifier uniquely identifies each computing device that is secured by altercation server 201 via the secure boot authentication procedure. The level-of-access may include links to different OS images that enable or disable different OS functionality, components, or access, decryption keys for decrypting different OS images, or configurable access permissions for different OS settings.

In some embodiments, the secure boot authentication procedure supports and/or may be completed using a cryptographically secure hardware key. For instance, the secure boot authentication procedure may be completed by a user physically inserting a Yubikey® or other Universal $2^{nd}$ Factor (U2F) device into a Universal Serial Bus (USB) port or other interface of the computing device. The cryptographically secure hardware key may be used to verify the user identity and the client device identity automatically with authentication server 201 without user input.

Figure 4:
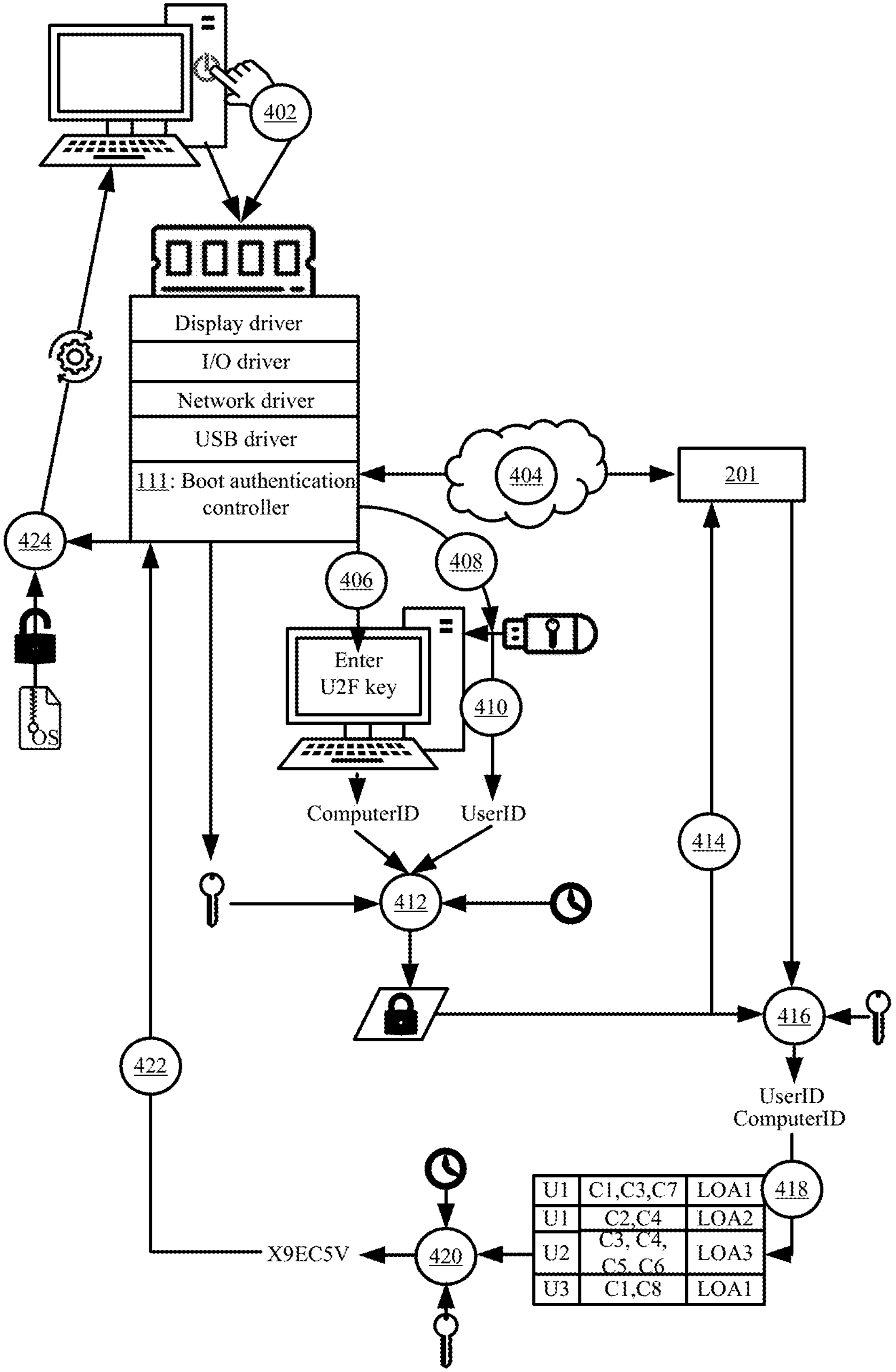
FIG. 4 illustrates an example of authenticating user access at the bootloader level with a cryptographically secure hardware key in accordance with some embodiments presented herein.

FIG. 4 illustrates an example of authenticating user access at the bootloader level with a cryptographically secure hardware key in accordance with some embodiments presented herein. The authentication procedure is initialized (at 402) upon a user powering on a computing device. The computing device performs the processor self-check, probes for the connected peripheral devices, loads the option ROMs, drivers, or other firmware for the connected peripheral devices, and begins execution of boot authentication controller 111 as a result of loading the option ROM, driver, or firmware of a detected non-volatile storage device.

Boot authentication controller 111 connects (at 404) to and/or communicates with authentication server 201 using a private network stack. In some embodiments, boot authentication controller 111 is compiled with the private network stack so that boot authentication controller 111 may communicate over a wired or wireless network without having to load or access the network stack of an OS. For instance, a cross-platform firmware development kit that is used to define boot authentication controller 111 (e.g., EDK II) may provide a Transmission Control Protocol (TCP)/Internet Protocol (IP) and/or User Datagram Protocol (UDP) implementation for IPV4 and IPv6 as well as protocol implementations for Domain Name System (DNS), Dynamic Host Configuration Protocol (DHCP), HyperText Transfer Protocol (HTTP), and/or other network services. The cross-platform firmware development kit may further provide a raw network socket implementation, a limited WiFi connection manager, and iPXE implementation. The libraries associated with these implementations may be used to enable communications between boot authentication controller 111 and authentication server 201 without running an OS on the computing device.

Boot authentication controller 111 may present (at 406) the encoded value for triggering the first authentication on the screen of the computing device and/or a message that instructs a user to enter their cryptographically secure hardware key into a port of the computing device. Boot authentication controller 111 detects (at 408) when the cryptographically secure hardware key is connected to the computing device. In some embodiments, boot authentication controller 111 uses PCI device module functions to detect peripherical devices that are attached to the computing device and, more specifically, when the cryptographically secure hardware key is attached.

Boot authentication controller 111 reads (at 410) data directly from the cryptographically secure hardware key. In some embodiments, the user may press a button on the cryptographically secure hardware key in order to activate the cryptographically secure hardware key and/or to initiate the transfer of the data to boot authentication controller 111. In some embodiments, the cryptographically secure hardware key has a microcontroller that dynamically generates the data that is passed to boot authentication controller 111. The microcontroller may encrypt the data or may encode the data with a time value so that the data continually changes. The data may include a unique user identifier and/or another unique identifier that identifies the user or a secure login token that is registered to the user.

Boot authentication controller 111 encodes (at 412) the data that is read from the cryptographically secure hardware key, the identifying data for the computing device, and a time-based code using the shared or public cryptographic key for the shared or private cryptographic key of authentication server 201. Boot authentication controller 111 sends (at 414) the encoded data to authentication server 201 using the private network stack.

Authentication server 201 decodes or decrypts (at 416) the data using its shared or private cryptographic key, verifies that the time-based code is valid, and determines (at 418) the level-of-access that the identified user has on the identified computing device. Authentication server 201 generates (at 420) a time-based code that encodes the determined level-of-access. The time-based code may be encoded with a link to a custom OS image or a decryption key for an encrypted OS image that boot authentication controller 111 is to load and/or install on the computing device.

Authentication server 201 transmits (at 422) the time-based code to boot authentication controller 111 over a data network. Boot authentication controller 111 receives the time-based code through the private network stack, decodes the time-based code using the shared or public cryptographic key, verifies that the time-based code is valid, and loads (at 424) the custom OS image that provides the user with the determined level-of-access.

Figure 5:
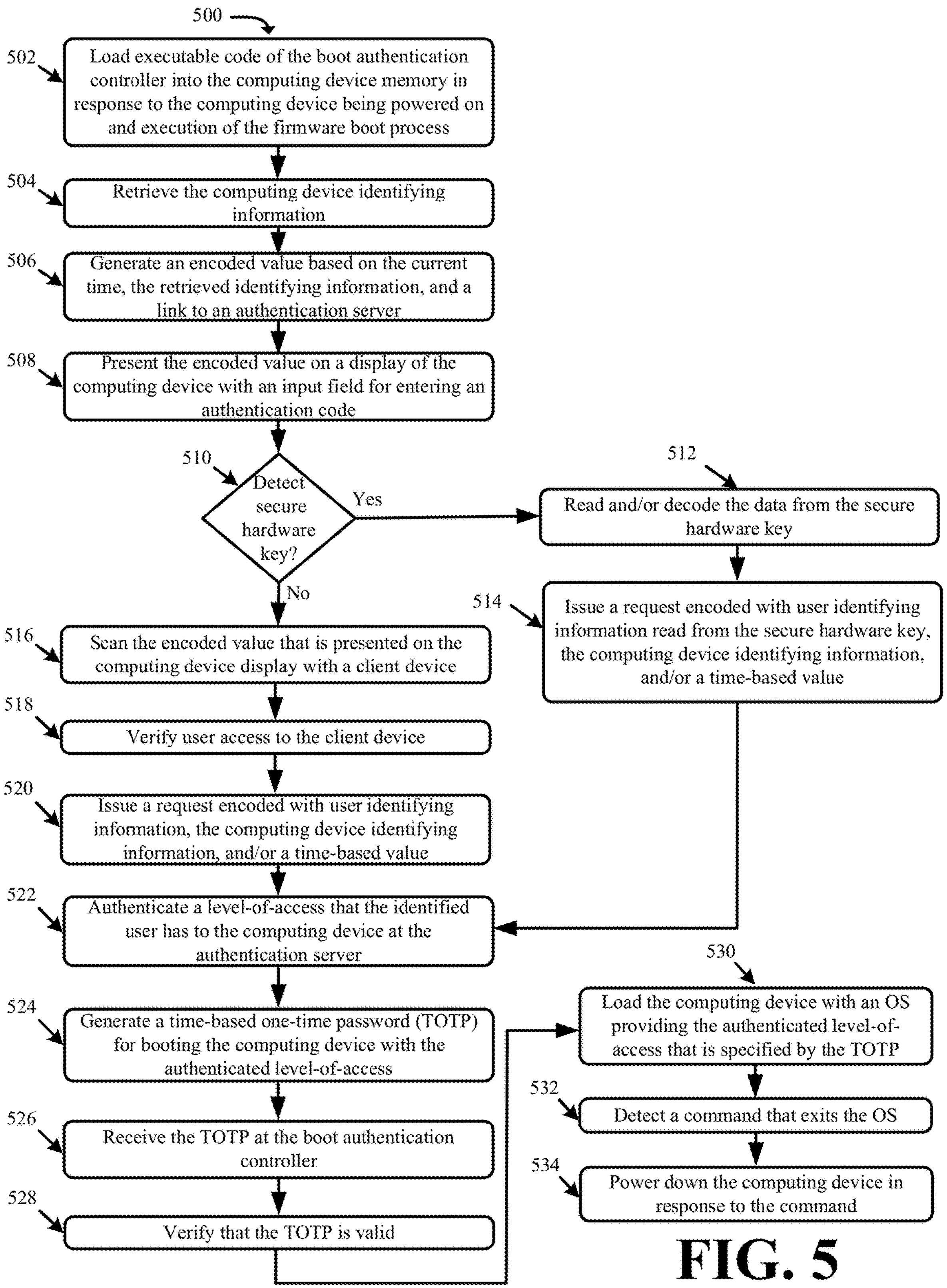
FIG. 5 presents a process for securing access to a computing device prior to loading the computing device operating system in accordance with some embodiments presented herein.

FIG. 5 presents a process 500 for securing access to a computing device prior to loading the computing device OS in accordance with some embodiments presented herein. Process 500 is implemented by a boot authentication system that involves the concerted operation of boot authentication controller 111, authentication server 201, and/or client device 203.

Process 500 includes loading (at 502) executable code of boot authentication controller 111 into the computing device memory in response to the computing device being powered on and execution of the firmware boot process. For instance, the computing device boot process involves probing the communication bus for connected peripherical devices, detecting a non-volatile storage device, and loading the EFI or bootloader file on the non-volatile storage device into memory. Alternatively, the executable code of boot authentication controller 111 may be stored in the computing device firmware (e.g., BIOS or UEFI) and loaded into memory when the firmware is accessed during the boot process.

Process 500 includes retrieving (at 504) computing device identifying information. Boot authentication controller 111 may store or query the computing device for the identifying information. The identifying information may include one or more of the computing device name, assigned network address, unique hardware identifiers, and hardware serial numbers. Boot authentication controller 111 may read the identifying information from the firmware of the computing device and/or connected peripheral devices.

Process 500 includes generating (at 506) an encoded value using a secret that is shared with authentication server 201 or a public cryptographic key for a private cryptographic key that is used by authentication server 201. Generating (at 506) the encoded value includes encoding a current time, the retrieved (at 504) identifying information, and a link to authentication server 201 or a command to open a boot authentication application on a client device to the encoded value. The encoded value is generated (at 506) in a machine-readable format. For instance, the encoded value is a QR code.

Process 500 includes presenting (at 508) the encoded value on a display of the computing device with an input field for entering an authentication code. Boot authentication controller 111 presents (at 508) the encoded value using a basic display driver that is loaded during the computing device boot process.

Process 500 includes determining (at 510) if a U2F device for secure boot authentication is connected to the computing device. Boot authentication controller 111 may scan the USB ports of the computing device to detect a secure hardware key that is connected to any of the USB ports.

In response to determining (at 510-Yes) that a U2F device is connected to the computing device, process 500 includes reading (at 512) and/or decoding the data from the U2F device, and issuing (at 514) a request that is encoded or encrypted with the user identifying information that is read from the U2F device, the computing device identifying information, and/or a time-based value to authentication server 201 using a private network stack of boot authentication controller 111.

In response to determining (at 510—No) that a U2F device is not connected to the computing device, process 500 includes scanning (at 516) the encoded value that is presented on the computing device display with a client device. The client device may include a smart phone, tablet device, or other device that is registered to a specific user. Process 500 includes verifying (at 518) user access to the client device in response to the user providing access credentials and/or biometric verification to unlock the client device or to login into a boot authentication application running on the user device. Process 500 includes issuing (at 520) a request from the client device to authentication server 201. In this case, the request is encoded or encrypted with user and client device identifying information that is accessed as a result of the user successfully unlocking the client device or logging into the boot authentication application, the computing device identifying information, and/or the time-based value.

Process 500 includes authenticating (at 522) a level-of-access to the computing device at authentication server 201 in response to receiving the request from boot authentication controller 111 or the client device. Authenticating (at 522) the level-of-access includes using a shared or private cryptographic key of authentication server 201 that is associated with the shared or public cryptographic key used by boot authentication controller 111 to decode or decrypt the contents or data of the request, comparing the time-based code included with the request against a time-based code generated by authentication server 201 using the same shared secret that is configured on boot authentication controller 111, verifying that the time-based code is valid, verifying the user identify based on verification performed on the client device or verification confirmed through the secure hardware key, and determining the level-of-access that the identified user has on the computing device. In some embodiments, authenticating (at 522) the level-of-access includes selecting a custom OS image that provides the authenticated (at 522) level-of-access from an available set of custom OS images that provide different levels-of-access to the computing device. For instance, authentication server 201 selects the custom OS image that is preconfigured with certain access permissions (e.g., read and write, read only, no access, etc.) to specific folders, paths, and/or system and/or that includes certain OS features, functionalities, Application Programming Interfaces (APIs), and/or libraries associated with the authenticated (at 522) level-of-access.

Process 500 includes generating (at 524) a time-based one-time password (TOTP) for booting the computing device with the authenticated (at 522) level-of-access. In some embodiments, authentication server 201 generates (at 524) the TOTP to encode an identifier for the authenticated (at 522) level-of-access on the identified computing device that expires after a period of time. In some embodiments, the identifier is a value that corresponds to different preconfigured OS levels-of-access. For instance, a first value may specify administrator-level access, a second value may specify access that users associated with a first role have, a third value may specify access that users associated with a second role have, and a fourth value may specify limited or restricted access that unauthorized users or users with minimal access have. In some other embodiments, the identifier is a link to a network-accessible location where the custom OS image providing the authenticated (at 522) level-of-access may be downloaded or accessed. In still some other embodiments, the identifier is a decryption key for decrypting an encrypted copy of the custom OS image providing the authenticated (at 522) level-of-access. The encrypted copy may be stored along with encrypted copies of other custom OS images providing different levels-of-access on the non-volatile storage device of each computing device.

Process 500 includes receiving (at 526) the TOTP at boot authentication controller 111. If a U2F device is connected to the computing device, then authentication server 201 distributes the TOTP directly to boot authentication controller 111 via the private network stack that is run by boot authentication controller 111. If the client device scans the QR code and submits the request to authentication server 201, then authentication server 201 distributes the TOTP to the client device, the client device presents the TOTP on a display, and the user enters the TOTP to the computing device using an input device of the computing system.

Process 500 includes verifying (at 528) that the TOTP is valid. For instance, boot authentication controller 111 may decode the TOTP using a shared or public cryptographic key for the shared or private cryptographic key that authentication server 201 used to encode or encrypt the TOTP, may extract the time-based value associated with the TOTP, and may compare the extracted time-based value to a time-based value that boot authentication controller 111 generates using the same shared secret that authentication server 201 used to generate the time-based value.

Process 500 includes loading (at 530) the computing device with an OS providing the authenticated (at 522) level-of-access that is specified by the TOTP. In some embodiments, boot authentication controller 111 downloads a custom OS image that provides the authenticated (at 522) from a remote source over the network using a URL that is decoded from the TOTP. In some other embodiments, boot authentication controller 111 selects and decrypts an encrypted custom OS image that provides the authenticated (at 522) and that is stored on a local hard drive, disk, or non-volatile storage medium of the computing device using a decryption key that is decoded from the TOTP.

Process 500 includes detecting (at 532) a command that locks, logs out, sleeps, or otherwise exits the OS. Process 500 includes automatically powering (at 534) down the computing device in response to detecting (at 532) the command. The custom OS image is configured to shut off the computing device once the user exits the OS to prevent another user from subsequently logging in through the user's account and obtaining the user's authenticated (at 522) level-of-access.

Figure 6:
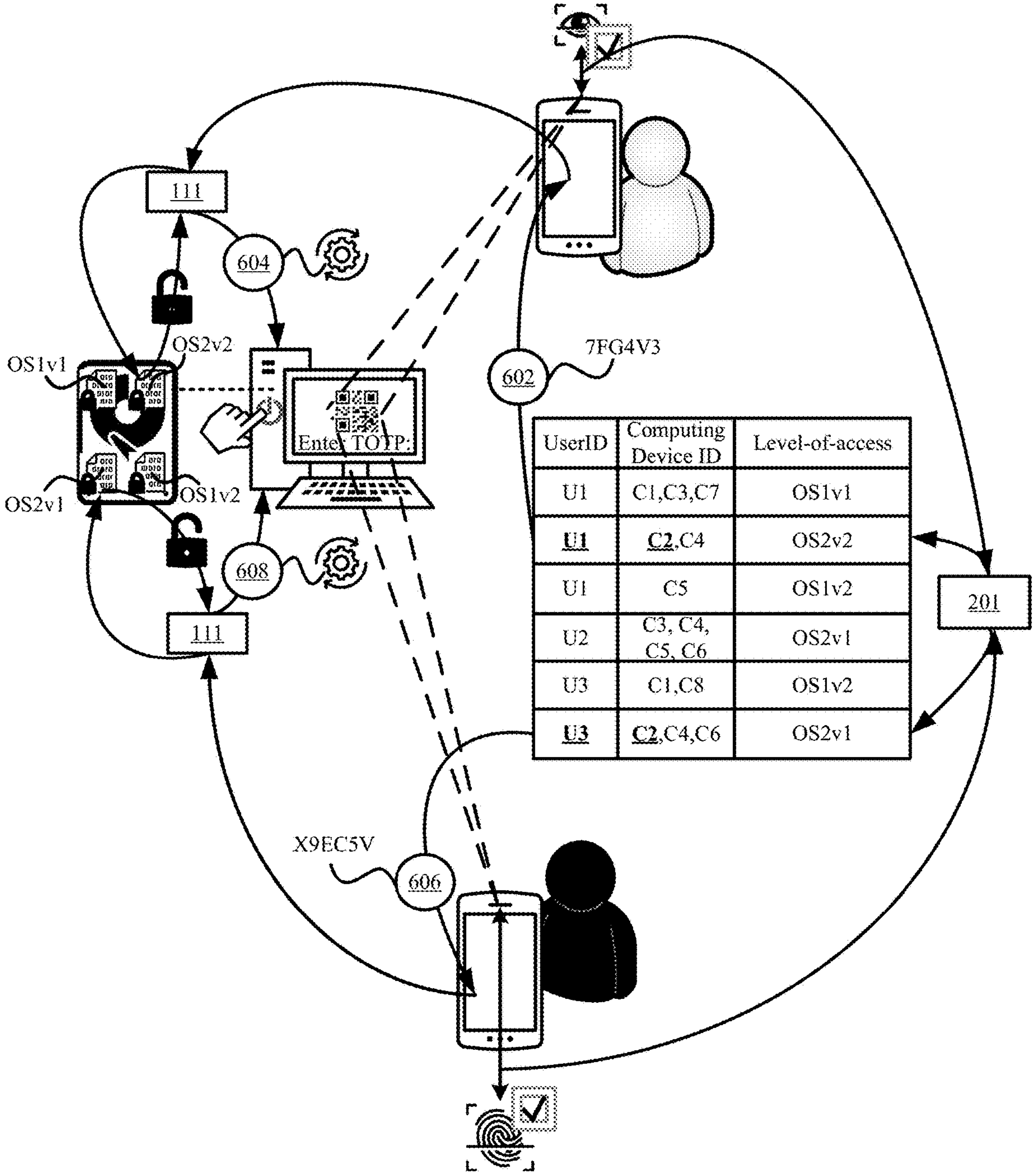
FIG. 6 illustrates an example of changing the level-of-access to the computing device at the bootloader level in accordance with some embodiments presented herein.

FIG. 6 illustrates an example of changing the level-of-access to the computing device at the bootloader level in accordance with some embodiments presented herein. A first user completes the secure boot authentication procedure during bootup of the computing device and is provided (at 602) with a first TOTP. The first TOTP encodes a link to a first custom OS image that provides the first user with a first level-of-access. For instance, the first custom OS image blocks or restricts communication over certain network ports and/or prevents access to databases or file systems associated with a set of paths. Boot authentication controller 111 loads and configures (at 604) the computing device with the first custom OS so that the first user has the first level-of-access while accessing the computing device. The computing device powers down and/or turns off at the end of the first user session.

A second user turns on the computing device and completes the secure boot authentication procedure during bootup. The second user receives (at 606) a second TOTP from authentication server 201. The second TOTP encodes a decryption key for an encrypted second custom OS image that is stored on the non-volatile storage of the computing device and that provides the second user with a greater second level-of-access than the first level-of-access. For instance, the second custom OS image opens or enables communication over the network ports that are blocked by the first custom OS image and/or provides access to databases or file systems associated with the set of paths that are blocked by the first custom OS image. Boot authentication controller 111 decrypts the encrypted second custom OS image using the decryption key and loads, installs, and runs (at 608) the second custom OS image on the computing device during the second user session with the computing device.

The boot authentication system and/or authentication server 201 may be implemented with a distributed architecture to avoid a scenario in which a centralized authentication server 201, that experiences a failure or that becomes temporarily unreachable, prevents users from logging into the computing devices and/or accessing the computing devices with their authenticated levels-of-access. The distributed architecture may use a blockchain to ensure that any changes or updates to the users' level-of-access are persisted across all authentication nodes of the distributed architecture.

Figure 7:
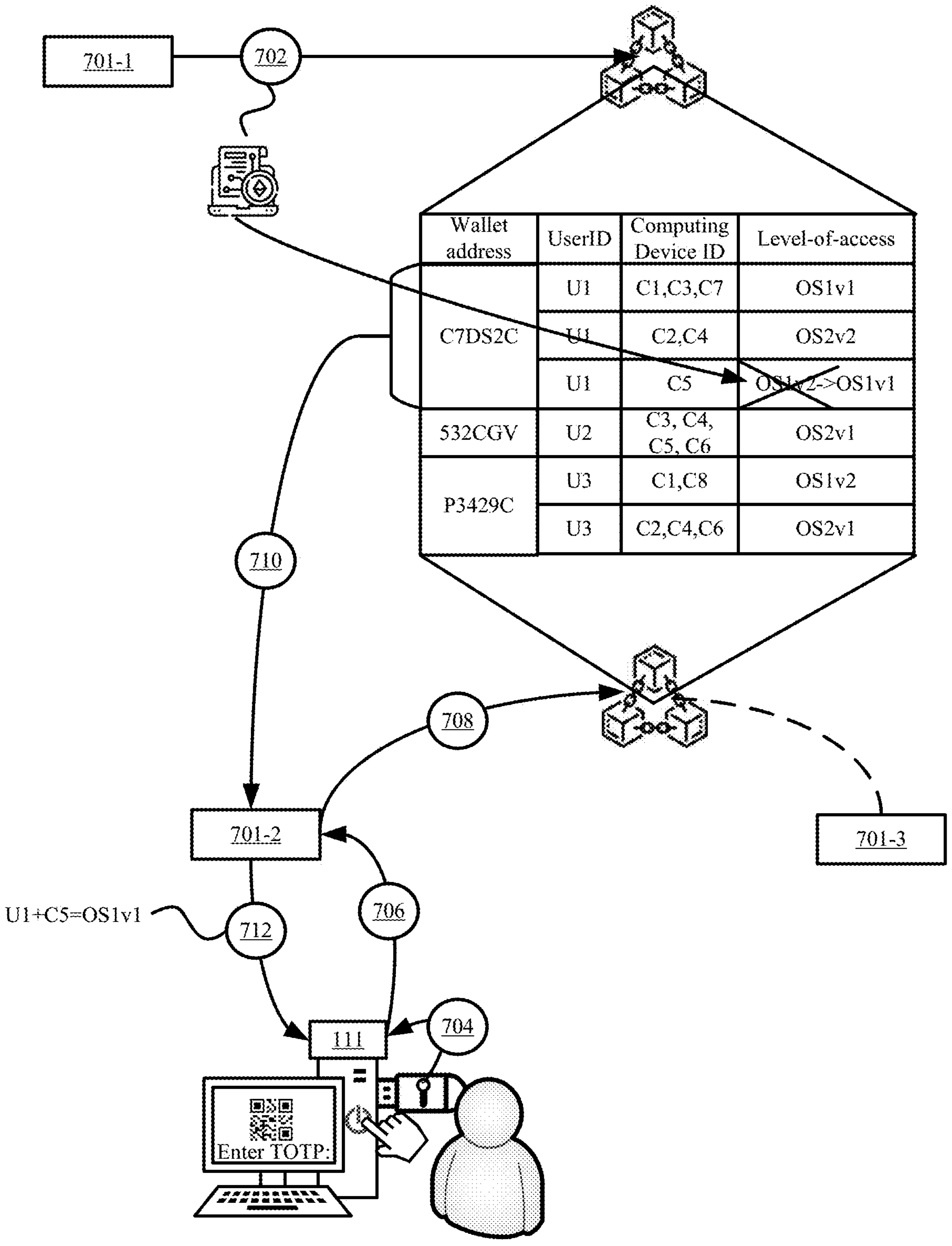
FIG. 7 illustrates an example of securing access to a computing device at the bootloader level using a distributed architecture in accordance with some embodiments presented herein

FIG. 7 illustrates an example of securing access to a computing device at the bootloader level using a distributed architecture in accordance with some embodiments presented herein. Operation of authentication server 201 is distributed across different authentication nodes 701-1, 701-2, and 701-3 of the distributed architecture.

First authentication node 701-1 may update (at 702) the level-of-access that a particular user has on a particular computing device. The update may be recorded with a new transaction or block on the blockchain. The blockchain encrypts the level-of-access that different users have on different computing devices and tracks previous levels-of-access that the different users have had based on the immutable and/or auditable blockchain ledger. Accordingly, updating (at 702) the level-of-access of the particular user may include adding a new block to replace an old block that encrypted the previous level-of-access.

The particular user may power on the particular computing device, and boot authentication controller 111 running on the particular computing device may perform (at 704) the secure boot authentication procedure at the bootloader level. Boot authentication controller 111 connects to the blockchain network via second authentication node 701-2. In particular, boot authentication controller 111 may request information that has been encoded on the blockchain using a blockchain wallet address that is associated with the user. For instance, boot authentication controller 111 may obtain the authentication credentials from a U2F device that is connected to the computing device, may complete the first authentication of the user, and may submit (at 706) a first authentication confirmation to second authentication node 701-2. The first authentication confirmation may include a value that directly or indirectly maps to the blockchain wallet address storing the different levels-of-access that the user has on different computing devices. In some embodiments, the blockchain wallet address corresponds to the user identifier. Second authentication node 701-2 queries (at 708) the blockchain to retrieve (at 710) encoded data at the user's blockchain wallet address that specifies the different levels-of-access that the identified user is authorized to access. Second authentication node 701-2 decodes the data, determines the computing device that the user is accessing from the first authentication confirmation, and provides (at 712) the level-of-access that the user has on the computing device to boot authentication controller 111. Boot authentication controller 111 may then load and configure the computing device OS to grant the user access to the computing with the specified level-of-access. Should any of the authentication nodes 701 become temporarily unavailable, boot authentication controller 111 may be configured to access other available authentication nodes.

The operation of the client device may also be modified to communicate through the distributed architecture. For instance, the client device may be used to scan or read the encoded value that is generated by boot authentication controller 111. The client device may require the user to perform a secure login on the client device or a boot authentication application installed on the client device. The client device may authenticate the user credentials with the blockchain using any of the authentication nodes, and may receive or generate the TOTP for an authenticated level-of-access.

Figure 8:
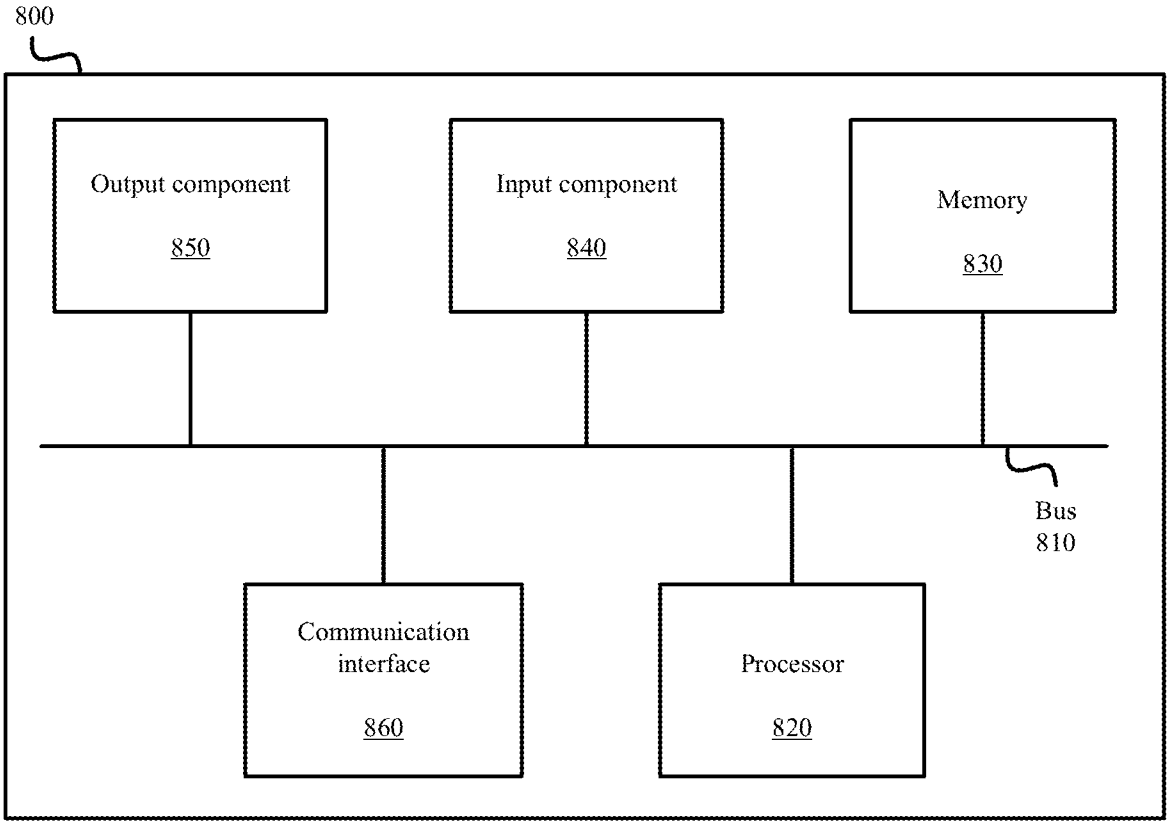
FIG. 8 illustrates example components of one or more devices, according to one or more embodiments described herein.

FIG. 8 is a diagram of example components of device 800. Device 800 may be used to implement one or more of the tools, devices, or systems described above (e.g., the boot authentication system, the computing device, authentication server 201, client device 203, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:

loading a boot authentication controller into a memory of a computing device in response to a boot process of the computing device initializing firmware for one or more components of the computing device after the computing device is powered on;

restricting access to the computing device based on execution of the boot authentication controller preventing an operating system (OS) from loading into the memory;

determining a level-of-access from a plurality of different levels-of-access that a particular user has on the computing device from an encoded value that is received by the boot authentication controller and that is dynamically generated by an authentication server in response to verifying that the particular user is authorized to access the computing device with the level-of-access, wherein the encoded value comprises a time-based code and an identifier corresponding to a location at which to access a custom OS image that is configured to provide the OS with the level- of-access from a plurality of different custom OS images;

customizing the OS with the level-of-access specified in the encoded value by:

decoding the encoded value using a decryption key configured on the boot authentication controller for a corresponding encryption key of the authentication server that was used to encode the encoded value, wherein decoding the encoded value comprises extracting the time-based code and the identifier;

retrieving the custom OS image from the location associated with the identifier after verifying validity of the time-based code; and configuring a customized OS on the computing device using the custom OS image; and booting the computing device with the customized OS that provides the level-of-access based on said customizing.

2. The method of claim 1 further comprising:

replacing an OS bootloader of the computing device with the boot authentication controller.

3. The method of claim 1 further comprising:

replacing an Extensible Firmware Interface (EFI) file that controls the boot process of the computing device with a compiled executable binary of the boot authentication controller.

4. The method of claim 1 further comprising:

retrieving one or more computing device identifiers while restricting the access to the computing device during execution of the boot authentication controller;

generating a code that encodes the one or more computing device identifiers with a time- based value; and presenting the code on a display of the computing device with an input field for entering the encoded value.

5. The method of claim 4, wherein presenting the code comprises:

presenting a Quick Response (QR) code on the display while locking access to the OS and the computing device.

6. The method of claim 1 further comprising:

detecting a secure hardware key that is connected to a port of the computing device;

reading identifying information for the particular user from the secure hardware key; and authenticating the level-of-access based on the identifying information for the particular user and one or more identifiers of the computing device.

7. The method of claim 6, wherein authenticating the level-of-access comprises:

encoding the identifying information for the particular user and the one or more identifiers; and transmitting the encoding of the identifying information to the authentication server using a private network stack of the boot authentication controller.

8. The method of claim 1 further comprising:

updating a firmware of the computing device with executable code of the boot authentication controller.

9. The method of claim 1 further comprising:

extracting, from the encoded value, a key associated with the custom OS image;

wherein customizing the OS comprises:

decrypting the custom OS image using the key before configuring the customized OS with the custom OS image; and loading the customized OS into the memory.

10. The method of claim 1 further comprising:

extracting the time-based code as a first time-based code from the encoded value;

generating a second time-based code based on a current time and a shared secret stored by the boot authentication controller;

determining that the encoded value is valid based on the first time-based code matching the second time-based code; and loading the customized OS into the memory in response to determining that the encoded value is valid and customizing the OS.

11. The method of claim 1 further comprising:

verifying an identity of the particular user in response to a client device that is registered to the particular user signaling a successful authentication of the particular user.

12. The method of claim 1, wherein determining the level-of-access comprises:

initializing a private network stack compiled as part of the boot authentication controller without accessing a network stack of the OS;

communicating a unique identifier for a client device and identifying information about the particular user that are encoded with a second time-based code using a cryptographic key of the boot authentication controller to the authentication server using the private network stack; and receiving, at the boot authentication controller, the encoded value directly from the authentication server in response to said communicating.

13. The method of claim 12, wherein communicating the unique identifier and the identifying information comprises:

detecting a secure hardware key that is attached to the computing device; and reading the identifying information about the particular user from the secure hardware key.

14. The method of claim 1, wherein determining the level-of-access comprises:

initializing a private network stack of the boot authentication controller without accessing a network stack of the OS;

receiving the encoded value as an alphanumeric code that is entered by the particular user via an interface that is presented on the computing device;

transmitting the encoded value from the boot authentication controller to the authentication server via the private network stack; and receiving, by the boot authentication controller, the custom OS image directly from the authentication server over the private network stack in response to transmitting the encoded value to the authentication server.

15. The method of claim 1, wherein the encoded value is dynamically generated by the authentication server based on a time the computing device is powered on, an identification of the particular user, and an identification of the computing device, and wherein the encoded value changes in response to any of the time, the identification of the particular user, or the identification of the computing device changing.

16. The method of claim 1, further comprising:

generating, by the boot authentication controller, a first encoded data that encodes identifying information for the computing device and a second time-based code using a particular encryption key of the boot authentication controller;

providing the first encoded data to a client device that is different than the computing device;

triggering verification that authorizes the particular user access to the computing device with the level-of-access in response to providing the first encoded data to the client device, wherein triggering the verification comprises:

causing, in response to providing the first encoded data, the client device to issue a request with the first encoded data and a second encoded data that is generated by the client device to the authentication server, wherein the second encoded data identifies the client device and the particular user, and wherein the authentication server generates the encoded value in response to validating the second time-based code in the first encoded data, verifying that the client device is registered to the particular user identified in the second encoded data based on an association maintained by the authentication server, and determining the level-of-access available to the particular user on the computing device.

17. A computing device comprising:

one or more hardware processors configured to:

load a boot authentication controller into a memory of the computing device in response to a boot process of the computing device initializing firmware for one or more components of the computing device after the computing device is powered on;

restrict access to the computing device based on execution of the boot authentication controller preventing an operating system (OS) from loading into the memory;

determine a level-of-access from a plurality of different levels-of-access that a particular user has on the computing device from an encoded value that is received by the boot authentication controller and that is dynamically generated by an authentication server in response to verifying that the particular user is authorized to access the computing device with the level-of-access, wherein the encoded value comprises a time-based code and an identifier corresponding to a location at which to access a custom OS image that is configured to provide the OS with the level-of-access from a plurality of different custom OS images;

customize the OS with the level-of-access specified in the encoded value by:

decoding the encoded value using a decryption key configured on the boot authentication controller for a corresponding encryption key of the authentication server that was used to encode the encoded value, wherein decoding the encoded value comprises extracting the time-based code and the identifier;

retrieving the custom OS image from the location associated with the identifier after verifying validity of the time-based code; and configuring a customized OS on the computing device using the custom OS image; and boot the computing device with the customized OS that provides the level-of-access based on said customizing.

18. The computing device of claim 17, wherein the one or more hardware processors are further configured to:

replace an OS bootloader of the computing device with the boot authentication controller.

19. The computing device of claim 17, wherein the one or more hardware processors are further configured to:

replace an Extensible Firmware Interface (EFI) file that controls the boot process of the computing device with a compiled executable binary of the boot authentication controller.

20. A non-transitory computer-readable medium storing instructions that, when executed by one or more processors of a computing device, cause the computing device to perform operations comprising:

loading a boot authentication controller into a memory of the computing device in response to a boot process of the computing device initializing firmware for one or more components of the computing device after the computing device is powered on;

restricting access to the computing device based on execution of the boot authentication controller preventing an operating system (OS) from loading into the memory;

determining a level-of-access from a plurality of different levels-of-access that a particular user has on the computing device from an encoded value that is received by the boot authentication controller and that is dynamically generated by an authentication server in response to verifying that the particular user is authorized to access the computing device with the level-of-access, wherein the encoded value comprises a time-based code and an identifier corresponding to a location at which to access a custom OS image that is configured to provide the OS with the level-of-access from a plurality of different custom OS images;

customizing the OS with the level-of-access specified in the encoded value by:

decoding the encoded value using a decryption key configured on the boot authentication controller for a corresponding encryption key of the authentication server that was used to encode the encoded value, wherein decoding the encoded value comprises extracting the time-based code and the identifier;

retrieving the custom OS image from the location associated with the identifier after verifying validity of the time-based code; and configuring a customized OS on the computing device using the custom OS image; and booting the computing device with the customized OS that provides the level-of-access based on said customizing.

* * * * *